Aug. 16, 1949.  E. H. JENNESS  2,479,118
COLLAPSIBLE DISH DRAINING RACK
Filed July 12, 1947  2 Sheets-Sheet 1

INVENTOR,
EDWIN H. JENNESS
BY
West & Oldham
ATTORNEYS

Aug. 16, 1949.　　　　　E. H. JENNESS　　　　　2,479,118
COLLAPSIBLE DISH DRAINING RACK
Filed July 12, 1947　　　　　　　　　　　　2 Sheets-Sheet 2
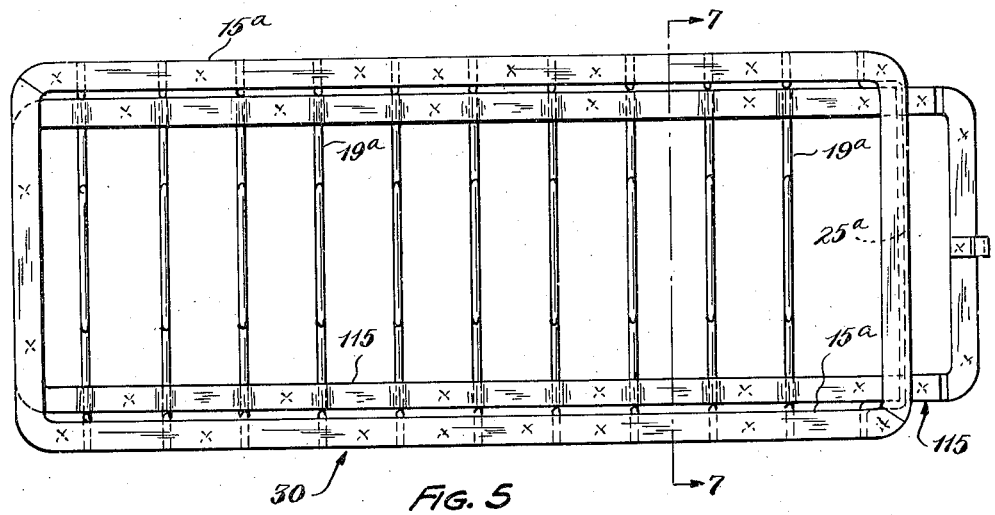
Fig. 5
Fig. 6
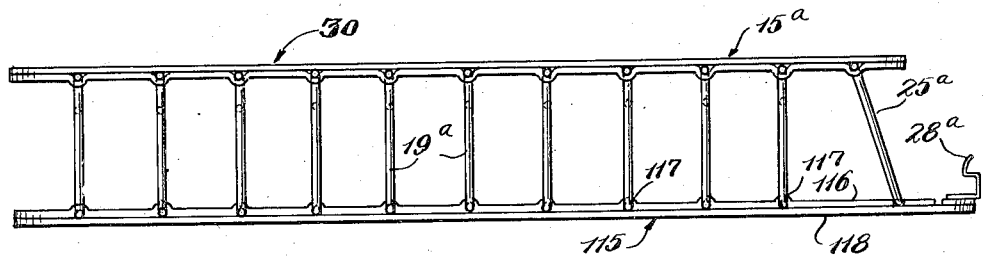
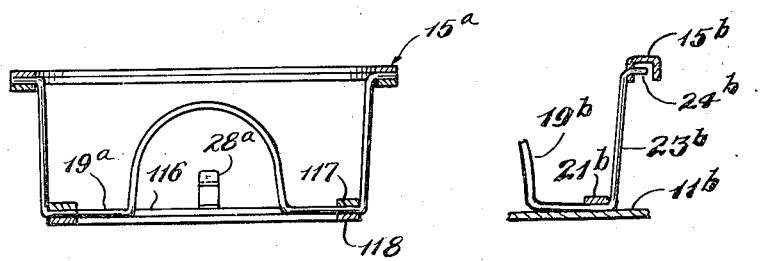
Fig. 7　　　　　Fig. 8
INVENTOR,
EDWIN H. JENNESS
BY
West & Oldham
ATTORNEYS Patented Aug. 16, 1949

2,479,118

UNITED STATES PATENT OFFICE 2,479,118

COLLAPSIBLE DISH DRAINING RACK

Edwin H. Jenness, Shaker Heights, Ohio

Application July 12, 1947, Serial No. 760,583

13 Claims. (Cl. 211—41)

This invention relates to collapsible dish racks adapted to be easily expanded into operative condition, or to be folded into a compact, inoperative position for storage.

Heretofore, there have been some attempts made to provide collapsible dish racks and various constructions of this general nature have been suggested. However, none of such proposed constructions have been satisfactory and the ordinary dish rack sold and used today is a bulky, awkward article that is difficult to store.

The general object of the present invention is to provide a novel, improved collapsible dish rack that is characterized by its ability to support dishes safely therein for draining and which is capable of being folded to provide a compact substantially planar article when stored.

Another object of the invention is to provide a collapsible dish rack that can readily be adjusted between operative and inoperative positions and, with equal facility, be secured fixedly in either of such positions.

Another object of the invention is to provide an inexpensive, uncomplicated, collapsible dish rack that is attractive in appearance and which is made from readily formed and conveniently assembled light weight members.

Another and a more limited object of the invention is to provide an open centered upper frame for a dish rack which is adapted to retain dishes in engagement with the rack and which is mounted on trunnion portions of dish support wires journaled on the base of the rack.

Yet another object of the invention is to provide a collapsible dish support rack involving relatively movable top and bottom portions that are operatively connected by means of dish support wires.

Another object of the invention is to provide, in a collapsible dish support rack, a light weight laminated frame designed and constructed to afford a plurality of bearings, which frame is formed from one flat member and another member associated therewith and having a plurality of arcuate offset or depressed portions forming said bearings.

The foregoing and other objects and advantages of the invention will be made apparent as the specification proceeds.

Reference now is made to the accompanying drawings wherein

Fig. 5 is a plan of a modified form of collapsible dish rack;

Fig. 6 is a side elevation of the rack of Fig. 5;

Fig. 7 is a vertical section on line 7—7 of Fig. 5; and

Fig. 8 is a sectional detail showing a modified form of the upper frame of the rack.

Figure 1:
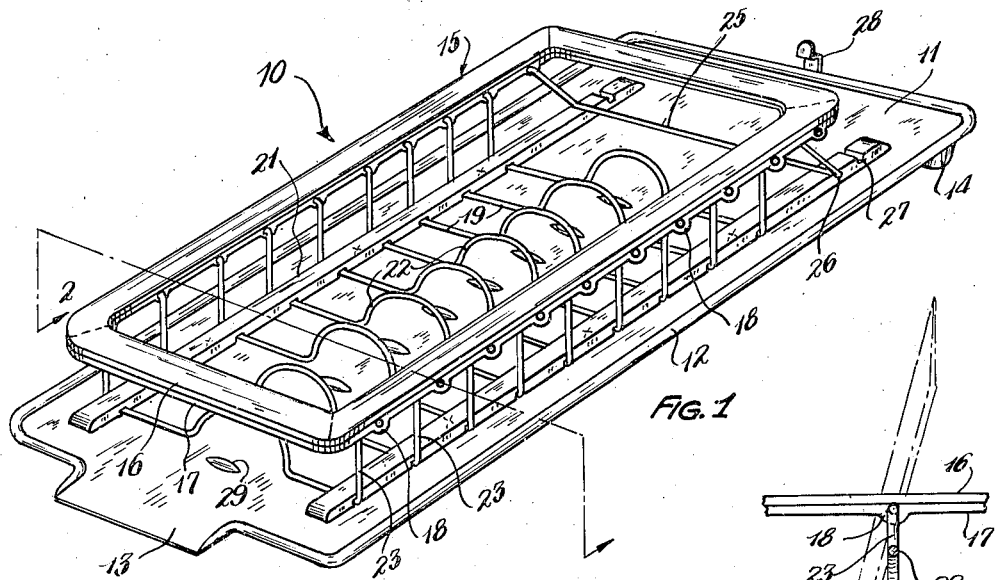
Fig. 1 is a perspective view of a collapsible dish rack embodying the principles of the invention.
Figure 4:
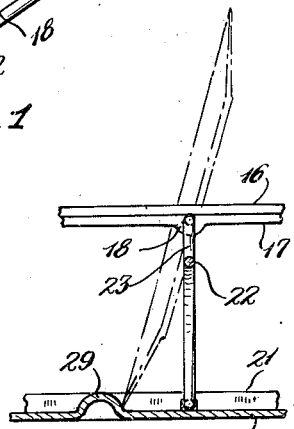
Fig. 4 is a vertical section taken on line 4—4 of Fig. 2.
Figure 2:
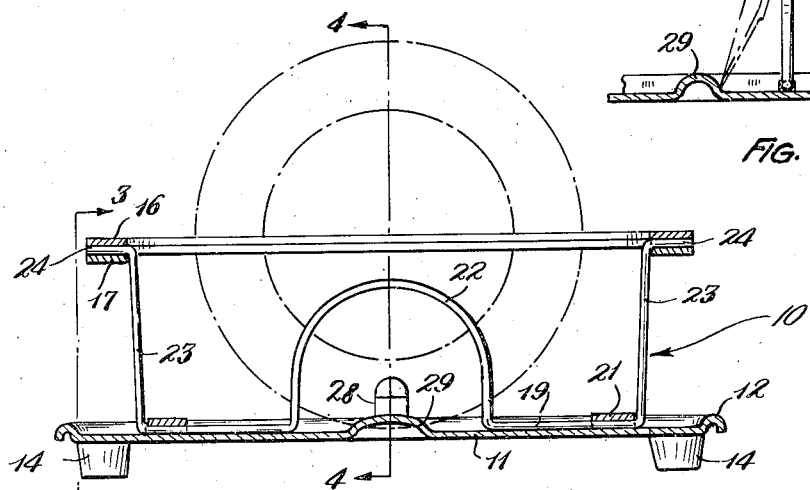
Fig. 2 is a transverse section taken on the line 2—2 of Fig. 1, with a dish being indicated in dotted lines as engaged in the rack.

Attention now is directed to the details of the construction disclosed in the drawings wherein a collapsible dish rack 10 is shown. The dish rack 10 includes a bottom tray 11 which has an edge bead 12 formed thereon in any conventional manner, which bead extends completely around the tray 11 except for a section thereof occupied by a discharge mouth 13 formed integral with the tray 11. The tray 11 ordinarily is formed from metal sheet, although in some instances it may be formed from plastic or other suitable material, and has any conventional edge reinforcement provided therefor. Preferably the tray 11 is provided with supporting members or feet 14 at the end thereof remote from the discharge mouth 13 so that the dish rack 10 can be positioned with the tray inclined toward the discharge mouth for discharge of water collecting on the tray.

Figure 3:
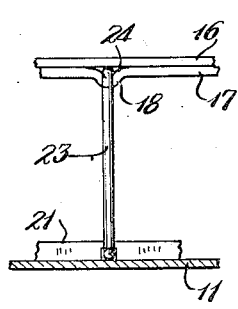
Fig. 3 is a vertical section taken on line 3—3 of Fig. 2.

As a feature of the invention, I provide an open centered, flat upper frame 15 for the dish rack. This upper frame 15 is laminated and includes an upper layer 16, and a lower layer 17, with such layers 16 and 17 being formed from a plurality of pieces which may be L shape so that no large die or other forming means is required in their manufacture, and so as to minimize waste of material. Preferably all of the pieces of the layers 16 and 17 are formed from stamped metal parts, although the invention is not limited to the use of such materials. The joints between the components forming the layers 16 and 17 are offset vertically with relation to each other, as indicated on Fig. 1, to provide a sturdy but light weight construction. Figs. 1 and 3 of the drawing clearly show that the sections comprising the lower layer 17 are provided with arcuate bearing portions or depressions 18. These portions 18 are spaced along a pair of opposed sides of the frame 15 and combine with the flat upper layer 16 to define bearings for means later to be described, and used in supporting and positioning the upper frame 15.

So as to provide dish support means in the disk rack 10, a plurality of dish support wires, or the like, 19 are positioned substantially flush against the upper surface of the tray 11 by means of a pair of supports or positioning bars 21 that are secured to the tray 11 in any desired manner, as by welding, in spaced but parallel relation. The wires 19 are pivotally positioned by the bars 21 for a purpose to be hereinafter described in detail and they are provided with dish supporting loops or arches 22 intermediate the portions of the wires engaged with the opposed positioning bars 21 so that such loops 22 can be disposed between positions substantially parallel with and at right angles to the tray 11. As a feature of the invention, the wires 19 extend beyond the positioning bars 21 and are provided with end sections or arms 23 which extend from the portion of the wire extending between the positioning bars 21 in the same general direction as do the loops 22. These arms 23 are provided with axially outwardly extending trunnions 24 that are journaled in the aforesaid bearing portions 18 so that the frame 15 is carried by the plurality of arms 23.

The foregoing construction permits arcuate movement of the frame 15, while the latter is maintained parallel with the tray 11, from a position closely adjacent the tray to one a substantial distance above the tray, with the arms 23 extending normally therefrom.

So as to retain the frame 11 in a given position with the dish support loops 22 at a desired angle to the tray 11, a substantially U-shaped bail 25 is pivotally carried by the upper frame 15 adjacent the end thereof remote from the discharge mouth 13. This bail 25 has trunnions at the ends thereof for engagement with bearing portions of the frame 15 and the bail is adapted to be engaged with any of a plurality of sets of recesses 26, 27, formed in the upper surfaces of the positioning bars 21. The dish rack 10 is adapted to be retained in a collapsed position by means of a resilient clip 28 that is carried by the tray 11 and extends upwardly from the end thereof adjacent the bail 25. This clip 28 is adapted to engage the frame 15 and retain it closely adjacent the tray 11 when the frame is swung to such position. The bail 25 may be used to hang up the dish rack 10, when it is collapsed. For such action, the bail 25 should be swung up out of engagement with the recesses 26 or 27 and held so as to extend out from the frame 15 whereby the bail 25 can be swung over the clip 28 and protrude from the dish rack for use as a hanger.

I preferably provide the tray 11 with upwardly extending bosses 29 that are located in the central portion of the tray adjacent each of the wires 19. Thus the bosses 29 can be used to retain the bottom of a dish engaged with the dish rack so as to position the dish at a desired angle to the vertical.

As a modification of the invention, I provide a dish rack 30 that is generally similar to the dish rack 10 but which eliminates the use of a bottom tray and provides a bottom frame member very similar to the upper frame member. In the dish rack 30, a bottom frame 115 and an upper frame 15a are pivotally connected by means of a plurality of wires 19a. In this instance, the frames 15a and 115 are of the same general construction as the frame 15 with one modification being made in forming the bottom frame 115, which is that the upper sections or layers 116 of the frame 115 are provided with bearing portions 117 therein that extend upwardly therefrom. These portions 117 combine with the lower section 118 of the frame to journal trunnions of the wires 19a therein. A positioning bail 25a is pivotally carried by the frame 15a, for engagement within notches in the frame 115 so as to hold the rack in either of two operative positions, and the top frame 15a coacts with a clip 28a for retaining the dish rack 30 in a collapsed position.

From the foregoing, it should be apparent that the dish rack of the invention, according to either of the illustrated embodiments, can be easily collapsed into a substantially flat condition for storage, and with equal ease expanded into condition for use. The components of the dish rack can be made from inexpensive but attractive materials so that a convenient, easily cleaned, long-wearing dish rack of pleasing appearance can be provided at low cost. The laminated sections of the frames used in the dish rack can be secured together in any conventional manner, such as welding, when the frame is made from metallic components. The dish support wires, as well as the rest of the dish rack, may be rubber covered, if desired.

An advantage in the form of the invention wherein a tray constitutes the base member is that, when the rack is used on any surface liable to be damaged by water, the tray protects such surface. In such case, the rack is arranged so that the tray will discharge the water into a sink or other receptacle.

In the modification of the invention illustrated in Fig. 8, the upper frame, designated by the reference character 15b, includes side members that consist of downwardly opening channels, the inner flanges of which have spaced apertures that provide the bearings for the trunnions 24b on the arms 23b of the dish support elements or wires 19b. Said elements or wires 19b are pivotally connected, through the medium of positioning bars, to the tray 11b, one of such bars being shown at 21b.

While specific embodiments of the invention have been illlustrated and described in detail herein, further modification may be made without departing from the scope of the appended claims.

Having thus described my invention, what I claim is:

1. A dish rack comprising a support tray having a raised edge portion and a discharge mouth formed thereon, an open rectangular frame having a pair of sides spaced apart a distance greater than the dish adapted to be held therein, a pair of support members carried by said tray in spaced but parallel relation, a plurality of dish support elements journaled by and extending between said support members substantially flush against said tray, said elements having integral arms extending upwardly therefrom at the ends thereof and having trunnions pivotally engaged with said sides of the frame to position the same, each of said elements having an upwardly directed loop formed therein intermediate the journaled portions thereof adapted for engagement with an individual dish, a bail journaled at its ends on said frame and adapted to engage with recesses formed in said support members in a removable manner for retaining said elements and frame in a given position with relation to said tray but to permit the collapse of the said frame and elements, and a clip carried on said tray for retaining said elements and frame adjacent the surface of said tray when the rack is collapsed.

2. A dish rack as in claim 1 wherein said frame is laminated and comprises sheet sections of substantially L-shape with two flat sections being combined to form one layer of the frame and with two sections having arcuate bearing portions formed therein being combined to form another layer of the frame, said last-named sections being positioned so as to form a plurality of bearings with the remainder of said frame which receive the trunnions of the arm sections of said elements.

3. A dish rack as in claim 1 wherein means are provided on the tray for positioning said tray with its discharge mouth at the lower edge thereof.

4. A dish rack comprising a support tray, an open rectangular frame having a pair of sides spaced apart a distance greater than the dish adapted to be held therein, a pair of positioning members carried by said tray in spaced but parallel relation, a plurality of dish support elements journaled in and extending between said positioning members, said elements having integral arms extending upwardly therefrom at the ends thereof and pivotally engaged with said sides of the frame to position same, each of said elements having an upwardly directed loop formed therein adapted for support of an individual dish, and a support member journaled on said frame and adapted to removably engage with a recess in said positioning members for retaining said elements and frame in a given position with relation to said tray.

5. A dish rack as in claim 4 wherein said dish support elements and said frame can be pivoted down closely adjacent to said tray, and a clip is provided for retaining said elements and frame in the described position.

6. A dish rack as in claim 4 wherein said support member is in the form of a bail with its ends journaled on said frame so that it is capable of being swung beyond the end of the frame where it can be used as a hanger member for supporting the rack when stored.

7. A dish rack as in claim 4 wherein said tray has integral bosses formed thereon in the center portion of said tray adjacent each of said elements to aid in positioning a dish on edge in the rack.

8. A collapsible dish rack comprising a base member, a plurality of dish support wires journaled on said base member at spaced points therealong, each of said wires having dish support arches formed therein intermediate the journaled portions thereof and defining a plane therewith, each of said wires having end sections extending therefrom substantially in said frame, said end sections having trunnions formed thereon, an open quadrilateral upper frame having a pair of sides spaced apart a distance greater than the dish adapted to be held therein located parallel to and above said base member, said upper frame being positioned by the end sections of said wires which are pivotally engaged therewith to position said upper frame for movement through an arc while retained parallel to said base member, and means for retaining the upper frame in a position in spaced relation to the base member.

9. A collapsible dish rack comprising a base member, a plurality of dish support elements journaled on said base member in spaced but parallel relation, said elements having dish support portions formed therein, each of said elements having end sections in substantially the same plane as the dish support portions, an open quadrilateral upper frame having a pair of sides spaced apart a distance greater than the dish adapted to be held therein positioned above said base member, said upper frame being supported by the end sections of said elements which pivotally engage therewith to position said upper frame for swinging movement on said base member, and means for retaining the upper frame in a position in spaced relation to the base member.

10. A dish rack as in claim 9 wherein said means consisting of a device that is operatively connected to said upper frame and removably engages parts on said base member to retain said upper frame in a given position with respect to said base member.

11. A dish rack as in claim 9 wherein said upper frame is laminated and comprises sheet sections of angular shape with two flat sections being combined to form one layer of the frame and with two sections having arcuate bearing portions formed therein being combined to form another layer of the frame, said last-named sections being positioned so as to form a plurality of bearings with the remainder of said frame which receive the end sections of said elements.

12. A collapsible dish rack comprising an open base frame, a plurality of dish support elements pivotally connected to said base frame and extending between opposed portions thereof in spaced but parallel relation, said elements having dish support portions formed therein intermediate the pivoted portions thereof, each of said elements having end sections extending therefrom in the same general direction as the dish support portions, an open quadrilateral upper frame having a pair of sides spaced apart a distance greater than the dish adapted to be held therein positioned substantially parallel to and above said base frame, said upper frame being supported by the end sections of said elements which pivotally engage therewith to position said upper frame for movement on an arc centered on said base frame, and means operatively connected to said upper frame and adapted to removably engage with said base frame to retain said upper frame in a given position.

13. A dish rack as in claim 12 wherein said frames are laminated and comprise stamped metal sheet sections of angular shape with two flat sections being combined to form one layer of each frame and with two sections having arcuate bearing portions formed therein being combined to form another layer of each frame, said last-named sections being positioned so as to form a plurality of bearings with the remainder of each section of said frame for journaled engagement with said elements, the respective joints in the sections comprising the layers of said frames being at diagonally opposite corners of the frame.

EDWIN H. JENNESS.

REFERENCES CITED

The following references are of record in the file of this patent:

UNITED STATES PATENTS

| Number | Name | Date |
| --- | --- | --- |
| 646,295 | Maas | Mar. 27, 1900 |
| 1,682,654 | Andrews | Aug. 28, 1928 |
| 1,883,974 | Kusterle | Oct. 25, 1932 |
| 2,443,404 | Tallarico | June 15, 1948 |